United States Patent [19]

Gandhi

[11] Patent Number: 4,742,857
[45] Date of Patent: May 10, 1988

[54] TIRE PRESSURE SENSOR AND AIR SUPPLY TO MAINTAIN DESIRED TIRE PRESSURE

[75] Inventor: Shrikant A. Gandhi, Sunnyvale, Calif.

[73] Assignee: Techni Guidance, Inc., Santa Clara, Calif.

[21] Appl. No.: 916,847

[22] Filed: Oct. 7, 1986

[51] Int. Cl.$^4$ .............................................. B60C 23/00
[52] U.S. Cl. .................................... 152/418; 73/146.5;
137/225; 141/95; 141/302; 141/DIG. 1;
200/61.25; 307/10 R; 340/58; 364/558
[58] Field of Search ............... 152/415, 427, 429, 416,
152/418; 141/38, 95, 198, 302, 4, 65, 66, DIG.
1; 137/224, 225; 116/34 R; 73/146.4, 146.5;
200/61.22, 61.25; 340/58; 335/205; 364/506,
510, 558, 551; 307/10 R

[56] References Cited

U.S. PATENT DOCUMENTS

| | | | |
|---|---|---|---|
| 3,810,090 | 5/1974 | Davis, Jr. et al. | 340/58 |
| 3,852,717 | 12/1974 | Hosaka et al. | 340/58 |
| 3,961,309 | 6/1976 | Eddy | 340/58 |
| 3,977,355 | 8/1976 | Lorenz et al. | 116/34 |
| 4,004,271 | 1/1977 | Haven et al. | 340/58 |
| 4,067,376 | 1/1978 | Barbino | 152/418 |
| 4,131,878 | 12/1978 | Yasuo | 340/58 |
| 4,148,008 | 4/1979 | Lusk et al. | 340/58 |
| 4,235,185 | 11/1980 | Byram | 116/34 |
| 4,313,483 | 2/1982 | Brockmann | 152/416 |
| 4,330,774 | 5/1982 | Doty | 340/58 |
| 4,334,215 | 6/1982 | Frazier et al. | 340/539 |
| 4,337,718 | 7/1982 | Stewart et al. | 116/34 |
| 4,468,650 | 8/1984 | Barbee | 340/58 |
| 4,479,109 | 10/1984 | French | 340/58 |
| 4,582,108 | 4/1986 | Markow et al. | 152/418 |

Primary Examiner—Michael Ball
Assistant Examiner—Thomas Bokan
Attorney, Agent, or Firm—A. C. Smith

[57] ABSTRACT

A system for detecting the air pressure in each wheel and for effecting inflation or deflation in each wheel while the vehicle is operating including a controller (30) and a high pressure reservoir (34) mounted on each wheel. Each controller includes a magnet (45) that is positioned responsive to the pressure in the associated tire and a stationarily mounted solenoid detector (32) senses the position of the magnet and generates a signal which is fed to a data processor (97) for the generation of an output signal to the vehicle operator indicating the pressure in the tire. Additionally, through actuation of the control, a current is passed through a coil (62) on the solenoid detector to actuate the magnet (45) in an individual wheel for opening a valve and allowing air to flow through the tube (39) into the tire for raising the tire pressure, or to allow the exhaust of air to lower the tire pressure.

8 Claims, 6 Drawing Sheets

TIRE PRESSURE SENSOR AND AIR SUPPLY TO MAINTAIN DESIRED TIRE PRESSURE

BACKGROUND OF THE INVENTION

1. Field of the Invention

This invention relates to a vehicle mounted tire pressure sensor which renders a visual readout of the pressure of each tire and enables the operator to inflate or deflate individual tires while driving the vehicle.

2. Description of the Prior Art

In the past few years, there have been several developments in the sensing of vehicle tire pressures. These developments have grown out of concern for the vehicle tires because not only can harm and destruction of the tire result from an under-inflated or over-inflated condition, but vehicle safety is also affected in that a low or blown tire can seriously affect the vehicle handling properties.

In the evolution of tire pressure sensing, there has resulted indicators mounted on each wheel and showing the tire pressure. A system of this type is shown in U.S. Pat. No. 3,961,309, High-Low Tire Pressure Signal Switch, issued on June 1, 1976. This patent is indicative of several that provide visual or other indications at the wheel that the tire pressure is out of a normal range.

There also has resulted the sensing of the tire pressure and the remote indication, preferably in the view of the driver, signaling an out-of-normal range condition. U.S. Pat. No. 3,977,355, Low Tire Pressure Warning System with Mechanical Latching, issued on Aug. 31, 1976 and U.S. Pat. No. 4,004,271, Low Tire Pressure Warning System, issued on Jan. 8, 1977 are indicative of these types of devices. With these devices however, only a low pressure warning signal is transmitted to the driver.

Another type of vehicle tire pressure detection system senses the temperature at the tire and generates a signal responsive to that temperature for providing an indication that the tire pressure is low. This system utilizes an electromagnetic transducer for generating a remotely detectable signal indicating low tire pressure. Positioned at a point separate from the wheel is a receiver which senses a change in a magnetic field and generates within the view of the vehicle operator a visual warning. An example of this type of device is shown in U.S. Pat. No. 3,852,717, Device for Automatically Detecting Abnormal Conditions in Vehicle Tires, issued on Dec. 3, 1974. Inductively coupled devices are used in U.S. Pat. No. 4,131,878, Detector for a Pneumatic Tire, issued on Dec. 26, 1978 and U.S. Pat. No. 4,148,008, Tire Pressure Monitoring System, issued on Apr. 3, 1979 to indicate that the tire pressure is out of a normal range. A Hall effect switch, stationarily positioned, detects the pressure responsive signal in U.S. Pat. No. 4,330,774, Tire Pressure Sensing System, issued on May 18, 1982.

Examples of radio signal transmitters positioned on the wheel for transmitting the pressure signal to the vehicle are described in U.S. Pat. No. 3,810,090, Pneumatic Tire Low-Pressure Monitoring and Warning System, issued on May 7, 1974; and U.S. Pat. No. 4,334,215, Continuous Heat and Pressure Surveillance System for Pneumatic Tires, issued on June 8, 1982.

As an extension of previous systems for detecting vehicle tire pressure, there has also evolved systems for releasing air from over-inflated tires such as shown in U.S. Pat. No. 4,330,774, Tire Pressure Sensing System issued on May 18, 1982. For replacing air in under-inflated tires during operation of the vehicle, the system shown in U.S. Pat. No. 4,067,376, Tire Pressure Warning System, which issued on Jan. 10, 1978 is described.

It is the purpose of the present invention to provide an improved system for detecting and signaling the tire pressure to the vehicle operator and for providing to the operator the capability for releasing air or supplying air to any of the vehicle tires to bring the pressure within desired operating limits.

SUMMARY OF THE INVENTION

Apparatus for detecting air pressure in an inflated tire mounted on a rotatable wheel of a vehicle including a tire pressure sensor for controlling a pair of valves with a first valve positioned to allow air to flow from the tire and a second valve connected in a conduit leading from the tire to a high-pressure air reservoir formed to mount within the interior side of the wheel on which the tire is mounted. The pressure sensor also includes a movable magnet positioned responsive to the tire pressure detected and a magnetic field sensor stationarily positioned on the vehicle such that the position of the magnet is indicated by the strength of the magnetic field which, when detected, renders a signal responsive to the tire air pressure. A central control monitors the signals received from each tire and if the signal from one tire changes significantly, a command is generated to either inflate or deflate that tire automatically. Additionally, the sensor includes a stationarily-positioned electromagnetic coil which when energized can effect movement of the magnet in one direction to open the first valve or in another direction to open the second valve to either deflate or inflate the tire while the vehicle is being operated and the wheel is turning. Thus the same transducer serves to indicate the tire pressure, a change in tire pressure and to actuate selected valves to raise or lower the tire pressure.

DESCRIPTION OF A PREFERRED EMBODIMENT OF THE INVENTION

Figure 1:
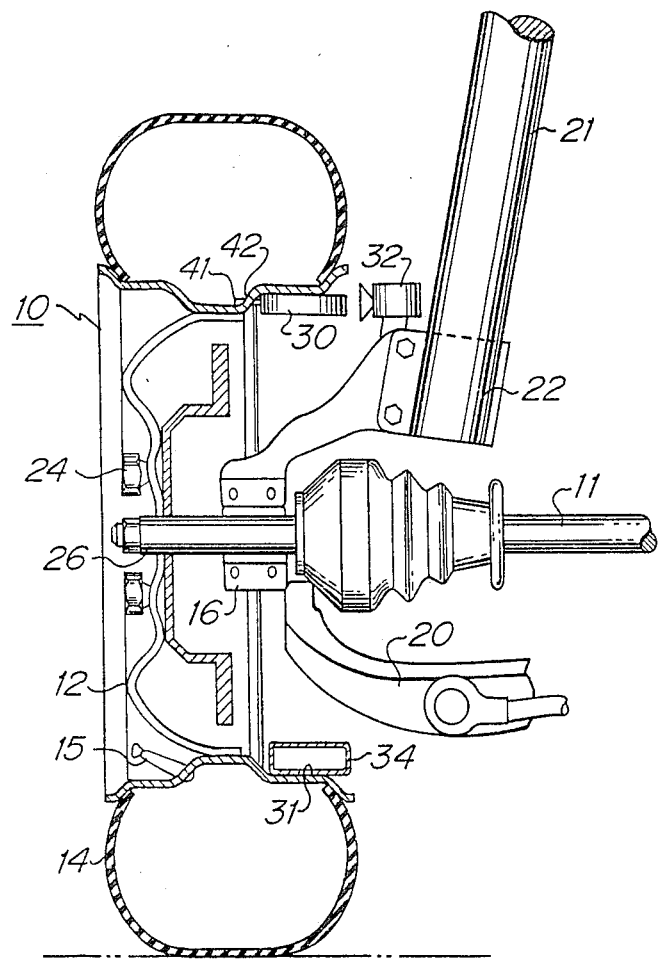
FIG. 1 is a view showing the tire and wheel in cross-section with the controller and reservoir illustrated.

In FIG. 1 is shown a standard wheel assembly of a vehicle (not shown) in which the subject invention can be applied. The wheel assembly 10 is rotatably supported on an axle assembly 11 extending to the vehicle. A wheel 12 supports a tire 14 inflatable through a standard valve assembly 15. The wheel is supported on the axle 11 by bearings 16 and is connected to a steering arm 20 and a shock absorber assembly 21. The shock absorber assembly is mounted to the axle assembly by a bracket 22. Lug nuts 24 screwed onto lug bolts fix the tire and wheel assembly to a hub assembly 26.

Figure 2:
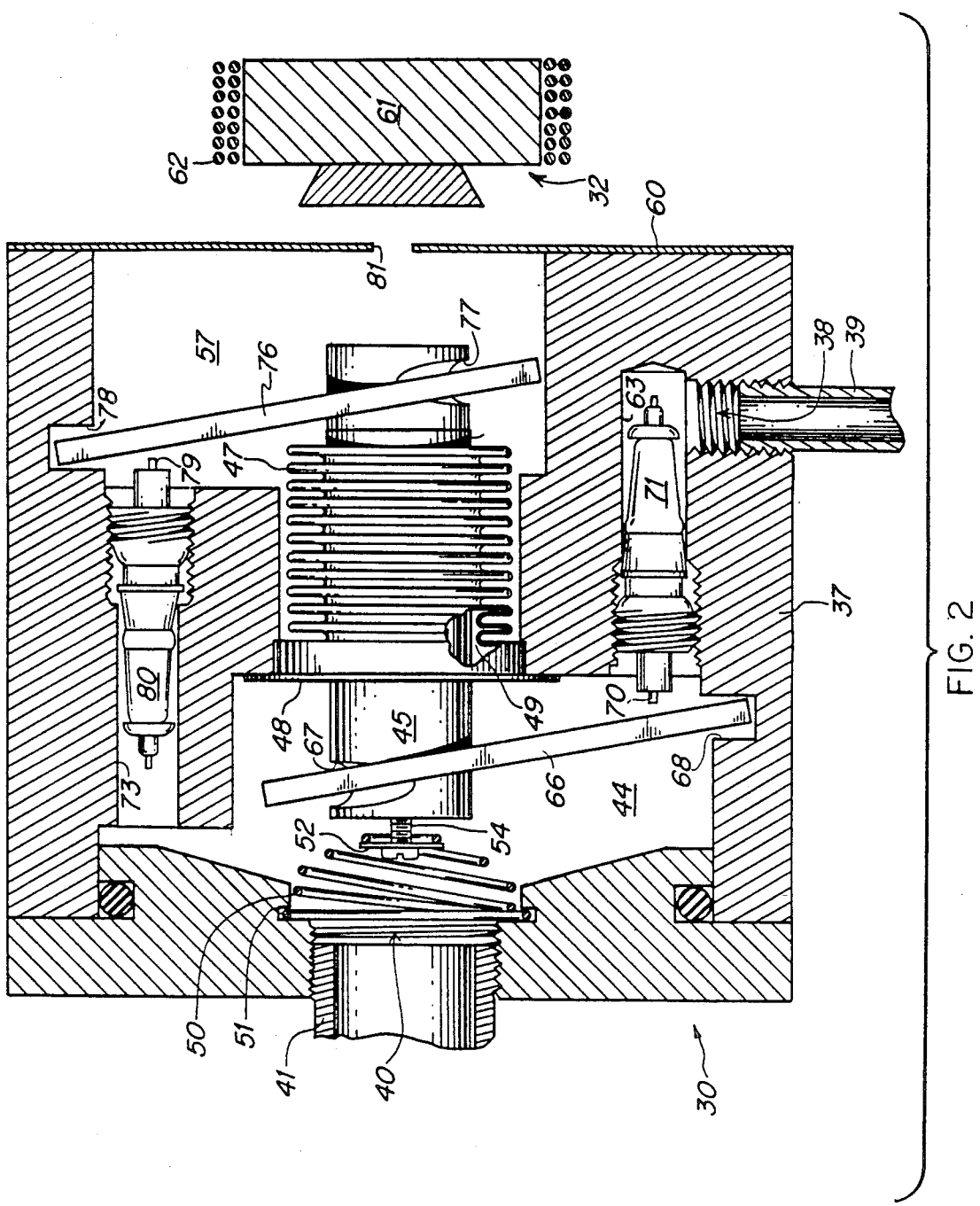
FIG. 2 is a cross-sectional view of the air pressure controller and detector.

The overall purpose of the present invention is to indicate within the view of a vehicle operator, the air pressure in each of the vehicle tires 14 and to allow regulation of the tire pressure in each tire. Accordingly, there is provided a controller 30 positioned adjacent the inside surface 31 of the wheel 12 with a detector or transducer 32 fixed to the bracket 22 of the shock absorber. Also positioned against the inside wall 31 of the wheel is a high pressure tube 34 serving as an air reservoir. As shown in FIG. 2, the controller comprises a housing 37 having a port 38 to which is connected a hose 39 leading to the high pressure reservoir 34. A second port 40 includes a tube 41 which passes through an opening 42 in the inner wall 31 of the wheel thereby exposing the inner cavity 44 of the controller to the same air pressure as the tire.

For detecting tire pressure, a magnet 45 is fixed or attached at the lower end by a flange 46 to a membrane or resilient bellows 47. The other end of the bellows is fixed to housing 37 by a collar 48 having an opening or aperture 49 through which the magnet projects. The end of the magnet in the inner cavity 44 is biased by a spring 50 extending between a channel 51 and a collar 52 held in place by an adjusting screw 54. In this manner, the internal air pressure of the tire entering through the port 40 into the chamber 44 shifts the position of the magnet 45 against the force of the atmosphere in an outer cavity 57 and the pull of the spring 50 in proportion to the tire air pressure. Thus, as the air pressure is less, the force of the pressured air in the chamber 44 pushing on the bellows 47 is less than the force from the atmosphere in the cavity 57 and the spring 50 thereby causing the magnet 45 to shift in a direction away from the plate 60. Similarly, if the air pressure in the tire is higher the increased air pressure in chamber 44 will tend to open the bellows thereby shifting the magnet 45 toward the plate 60.

The detector 32 comprises a magnetic core 61 around which is wrapped a wire coil 62. The end plate 60 on the controller is non-magnetic so as to allow the magnetic field of the magnet 45 to extend out of the controller. The magnetic field is sufficiently strong so as to intercept the coil 62 as the controller is moved past the detector. With the cutting of the lines of flux a voltage is generated in the coil 62 proportional to the number of flux lines and the number of coils. Thus as the magnet 45 is moved axially so also will the magnetic field such that it will intercept the coil 62 more or less and thereby generate more or less voltage in the coil 62 to render a signal in the coil 62 proportional to the pressure within the tire 14. By properly detecting that signal an indication of the tire pressure is detected.

Figure 3:
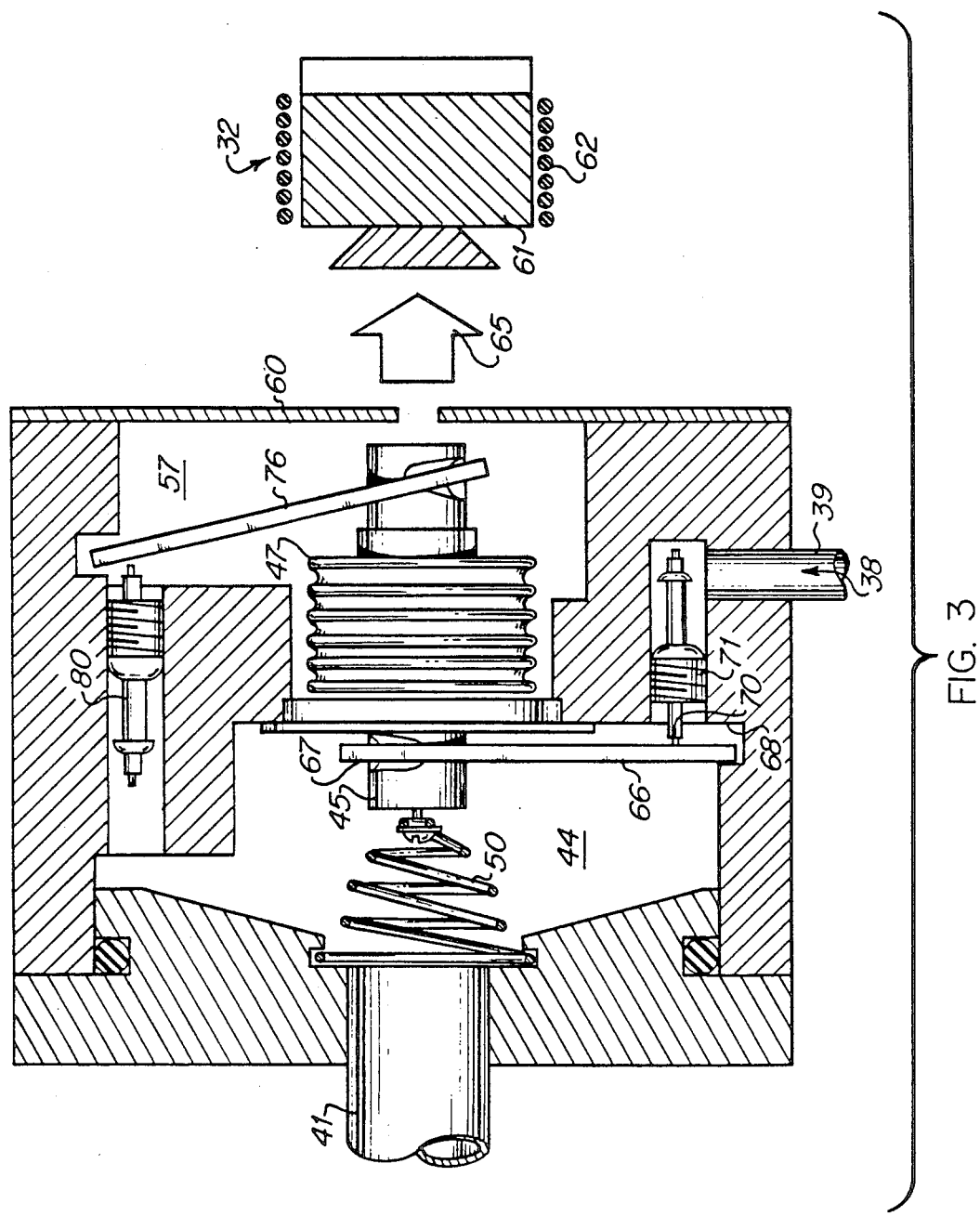
FIG. 3 shows the controller in the inflate mode.

In accordance with another feature of the invention the control system enables the vehicle operator to raise or lower the tire pressure on either the front or rear tires of the vehicle, or all the tires, while the vehicle is operating. For this purpose the controller can be energized either to permit air to pass into the tire or to allow air to be expelled from the tire by supplying to the electric coil 62 an electric current which either attracts or repels the magnet 45. In the inflate mode, i.e. it is desired to add air to the tire, electric current is passed through the coil so as to cause a flux field in the core 61 serving to attract the magnet 45 in the manner shown in FIG. 3. The arrow 65 indicates the direction of pull of the coil 62. Thus, each time the controller passes the solenoid the magnet 45 is pulled against the force of the spring 50. Connecting with the magnet 45 is a lever arm 66 which at one end interfits in a slot 67 in the magnet and into a recess 68 in the housing at the other end. Thus, when the magnet 45 is pulled from left to right in the drawing, the lever arm is caused to move in a clockwise direction so as to contact the actuating pin 70 of a valve 71 positioned within the channel 63. The valve 71 is a standard valve similar to those used for tubeless tires and threaded into the channel. Thus, the valve 71 is opened and higher pressured air is permitted to flow from the reservoir 34 through the hose 39 to the port 38 and from there into the cavity 44 and the tube 41 into the tire. The magnet 45 is actually actuated for a very short duration with each rotation of the wheel to allow short spurts of pressured air to pass from the reservoir to the tire so that pressure build-up is very gradual and controlled. When the coil 62 is de-energized, the magnet will remain in position to indicate the pressure in the tire.

Figure 4:
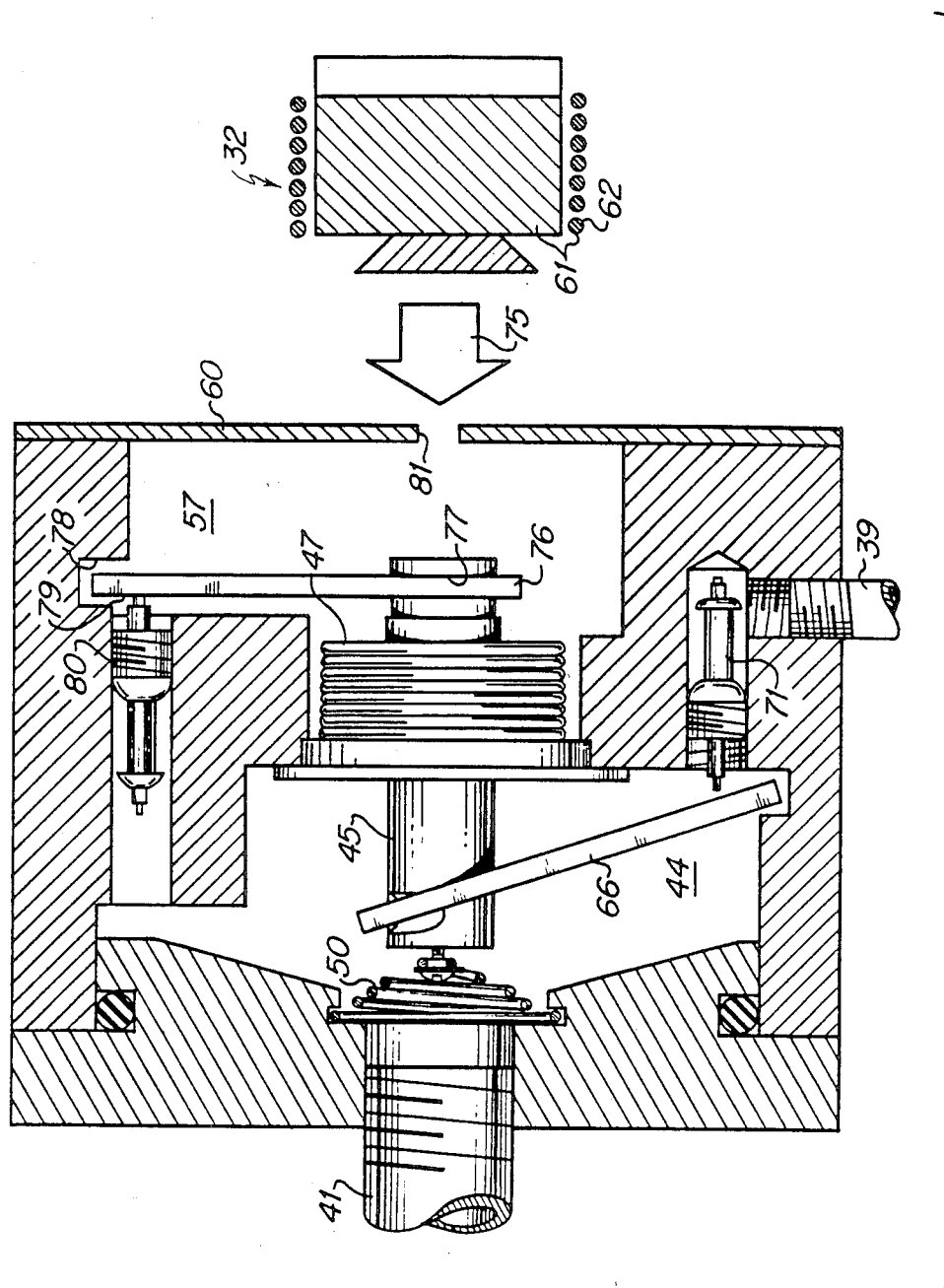
FIG. 4 shows the controller in the deflate mode.

If the tire is over pressured the coil 62 is energized to cause the force to be in the direction of the arrow 75 in FIG. 4 to release air from the tire. In this mode the magnet is repelled by the electric coil 62, and the spring 50 is compressed. This action causes a lever 76, which is supported between the recess 77 of the magnet and the recess 78 in the housing, to pivot in the clockwise direction into contact with the pin 79 of the valve 80, thereby opening the valve. Opening of the valve allows air to flow from the chamber 44 through the valve in the channel 73, into the cavity 57 and out the opening 81 to atmosphere. In this manner the valve 80 is opened slightly on each rotation of the wheel until the air pressure is reduced in the tire to the desired amount.

Figure 6:
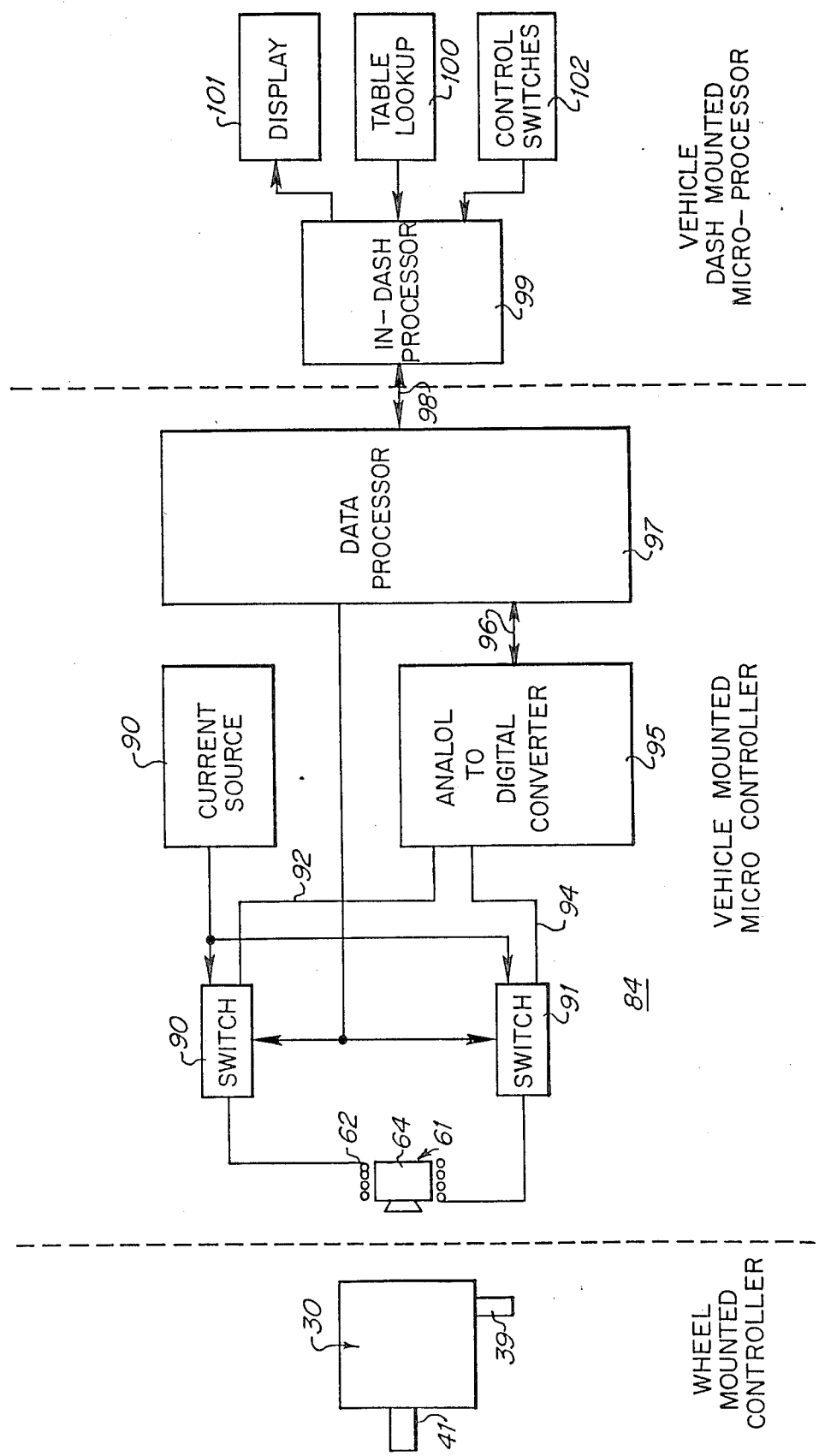
FIG. 6 is an electrical block diagram of the system.

In FIG. 6 is shown a block diagram of the system wherein the controller 30 with the connected tubes 39 and 41 is shown in diagrammatic form. Mounted adjacent the path of the controller as the wheel rotates is the microcontroller 84 including the coil 62 of transducer or detector 64. The signals detected as the flux field generated by the wheel-mounted controller pass the solenoid detector are generated in the coil 62 and pass through a pair of switches 90 and 91 to the conductors 92 and 94 and an analogue-to-digital converter 95 on through the conductor 96 to a data processor 97. These signals are indicative of the pressure of each wheel since the strength of the field is proportional to the position of the wheel-mounted magnet 45. Thus, the processor 97 receives the signal and communicates through a conductor 98 to a micro processor 85 including an in-dash processor 99 with a table look-up 100 to interpret that signal into a pounds per square inch or pascals bars readout which is displayed on a display 101. A plurality of switches 102 enable the vehicle operator to interrogate the system for a readout of the pressure of each tire on the vehicle.

When it is desired to change the pressure in a wheel, the appropriate control switches 102 are actuated to select the wheel and pressure desired, which information is shown on the display 101. When the switches are actuated to effect a pressure change, the processors 99 and 97 cause a signal to be sent to the switches 90 and 91 resulting in a current in a desired direction to be supplied from a current source 104 to the coil 62. Thus in the manner previously described, the magnet 45 associated with the selected wheel is actuated in the desired direction to either inflate or deflate the tire. In this manner the vehicle operator has complete information and control over the pressure condition of each tire, namely the air pressure measured and the pressure changes that can be effected on demand.

In operation, the microcontroller is regulated to check the initial reading for each tire when the vehicle is first accelerated up to speed. This reading for each tire is recorded and subsequent readings are repeated for each tire and are compared with this initial reading to detect any change. If a change occurs, the other tire readings are checked to see if similar changes have occurred, if not, action is automatically taken to correct the pressure of the tire that has changed. Also the control detects changes in the environmental temperature and by the table lookup feature, is capable of factoring out the effect of the higher or lower temperatures on the tire pressure. After corrective action is commanded a preset number of times on any one tire, an alarm is given to the vehicle operator, usually in the form of the tire indicator 110 flashing, to alert the operator of an ongoing problem with that tire. The tire indicators 110 are shown in FIG. 7.

Figure 7:
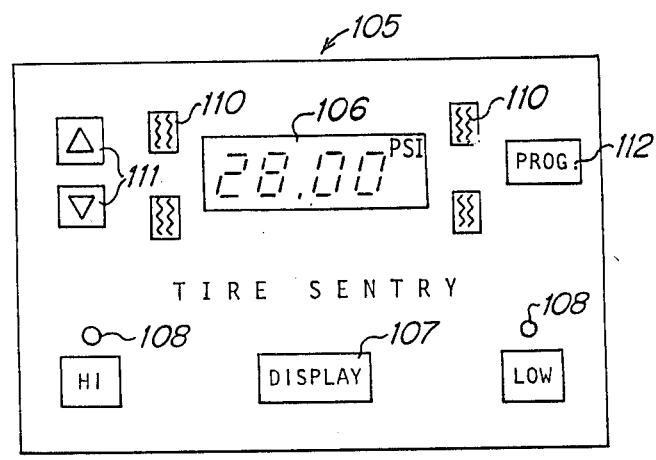
FIG. 7 shows the control panel visible to the vehicle operator.
Figure 5:
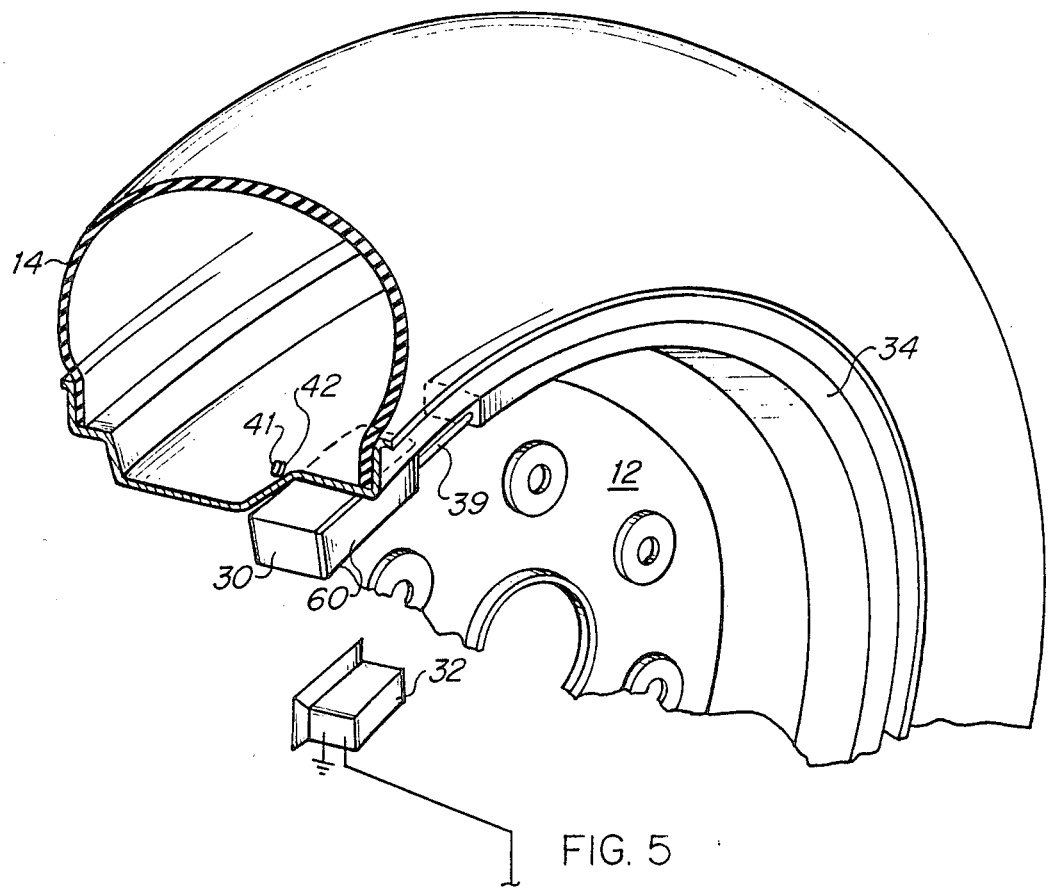
FIG. 5 is a perspective view, partially in cross-section, of the wheel with controller and reservoir.

The display 105 shown in FIG. 7 includes a window 106 showing the tire pressure of a selected wheel when a display button 107 is pressed. Hi and low buttons 108 and 109, respectively, are provided to allow selection of the tire pressure mode desired. The lower pressure mode is preferred for city driving and the higher pressure mode is usually preferred for expressway driving. For setting these pressures, the program button 112 is pushed followed by the pressing of the Hi or Low button to select the limit to be set. Thereafter by pressing the up or down buttons 111 the tire pressure mode can be selected. Indicators 110 indicate the tire being checked.

I claim:

1. Tire pressure control apparatus for regulating tire pressure on a rotating wheel, the apparatus comprising:
    housing means disposed to be attached to the wheel and having a chamber therein connected to the tire and having an aperture;
    magnet means disposed to slide within the aperture;
    resilient bellows means attached about one end thereof to the magnet means and about the other end thereof to the housing means to form a wall of the chamber exposed on one side thereof to air pressure in the tire and on the other side thereof to atmospheric pressure for positioning the magnet means within the aperture in response to air pressure in the tire;
    first valve means disposed in said housing means to be actuated by the magnet means at a selected position thereof;
    a source of air under pressure carried by the wheel and connected to the first valve means to supply air under pressure to the chamber in response to actuation of the first valve means by the magnet means;
    transducer means for mounting in fixed location relative to the rotating wheel in close proximity to the housing means rotating therewith, said transducer means producing an output indicative of the position of the magnet means in the aperture in response to the rotation thereof relative to the transducer means; and
    control means coupled to the transducer means for producing a control signal in response to the output attaining a selected value, said control means supplying the control signal to the transducer means for positioning the magnet means to said selected position for actuating the first valve means to supply air under pressure to the tire.

2. Tire pressure control apparatus as in claim 1 comprising:
    second valve means disposed in said housing means to vent said chamber in response to actuation by the magnet means at a second selected position thereof;
    said control means produces a first control signal in response to said output attaining a first selected value and produces a second control signal in response to said output attaining a second selected value; and
    means coupling the control means and the transducer means for supplying one of the first and second control signals thereto for positioning the magnet means to one of said first and second selected positions for actuating one of the first and second valve means to alter the air pressure in the tire.

3. Tire pressure control apparatus as in claim 1 wherein:
    said magnet means is disposed to move along an axis that is substantially parallel to the axis of rotation of the wheel.

4. Tire pressure control apparatus as in claim 2 wherein:
    said first and second selected positions of the magnet means are at substantially opposite locations along the axis of the movement thereof within the aperture.

5. Tire pressure control apparatus as in claim 4 wherein:
    said transducer means produces attractive and repulsive forces on the magnet means in response to the application thereto of the first and second control signals.

6. Tire pressure control apparatus as in claim 2 wherein said control means comprises:
    analog to digital converter means for translating analog signals to representative digital signals;
    a current source disposed to supply current;
    circuit means coupled to said transducer means and to said current source for controlling the direction of current supplied to the transducer means; and
    processing means coupled to said analog to digital converter and to said circuit means for controlling said circuit means in response to said digital signals.

7. Tire pressure control apparatus as in claim 6 wherein said processing means produces an output signal indicative of said digital signals; and comprising:
    display means connected to receive said output signal from said processing means for producing an output indication of tire pressure.

8. Tire pressure control apparatus as in claim 6 comprising:
    input control means connected to said processing means for supplying control signals thereto to select the operating tire pressure.

* * * * *